United States Patent [19]
Orris

[11] 3,764,861
[45] Oct. 9, 1973

[54] ELECTRONIC SEAT SENSING SWITCH

[75] Inventor: Stephen J. Orris, Lincoln Park, Mich.

[73] Assignee: Chrysler Corporation, Highland Park, Mich.

[22] Filed: July 31, 1972

[21] Appl. No.: 276,636

[52] U.S. Cl. .................... 317/146, 307/116, 328/5, 340/258 B, 317/DIG. 2
[51] Int. Cl. .................... H01h 47/22
[58] Field of Search .................... 317/DIG. 2, 146; 180/102; 307/116, 118, 252 A, 308, 10 R; 328/5; 340/258 B, 258 C, 258 R; 315/238; 331/108 D

[56] References Cited

UNITED STATES PATENTS

| | | | |
|---|---|---|---|
| 3,200,306 | 8/1965 | Atkins et al. | 340/248 C |
| 2,947,913 | 8/1960 | Trostler | 315/238 |
| 3,305,724 | 2/1967 | Shaheen | 180/102 |

OTHER PUBLICATIONS

The Electronic Engineer — May 1970, pp. 55.

*Primary Examiner*—J. D. Miller
*Assistant Examiner*—Harry E. Moose, Jr.
*Attorney*—Russel C. Wells

[57] ABSTRACT

An electronic seat sensing switch placed within the cushion of a motor vehicle seat, senses the presence of an occupant sitting thereon. The sensor responds to the body capacitance of the occupant to electrically "load" the input to a complementary MOS, C/MOS, buffer and thereby blocking an alternating signal from an oscillator from being conducted by the buffer. The oscillator is isolated from the sensor by a second C/MOS buffer allowing a number of parallel switches to be electrically responsive to the output of the generator. The sensor does not affect the operation of the oscillator.

5 Claims, 10 Drawing Figures

ELECTRONIC SEAT SENSING SWITCH

BACKGROUND OF THE INVENTION

1. Field of Invention

This invention relates to electronic switch systems in general and to capacitive responsive electronic switches in particular.

2. Prior Art

Prior art capacitive responsive switches in general respond to the touch of a person to effect conduction of the associated oscillator. In particular, U.S. Pat. No. 3,025,434 teaches the use of two oscillators each responsive to a touch sensor for turning off the oscillator by firing an electronic tube and then in response to a second touch for turning the oscillator back on.

Another touch responsive switch illustrated in U.S. Pat. No. 3,080,509 shows a gas filled tube, a thyratron connected to an alternating current supply. The tube is responsive to the added capacity of a touch by an individual on a sensor electrically connected to its control grid. When the touch is removed, the tube is rendered non-conductive.

Still another capacitive responsive switch is illustrated in a taxi environment in U.S. Pat. No. 3,177,967. This patent illustrates a three parallel plate capacitor placed within the seat cushion of the back seat of the taxi for registering the presence of a passenger sitting thereon. When the passenger sits on the seat, his weight changes the dielectric spacing between the center plate and the outer two plates of the capacitor thereby increasing the capacitance. The capacitor is electrically connected to an oscillator and normally the oscillator is tuned with the capacitor dielectric non-compressed. However, with the dielectric compressed causing increased capacity, the oscillator is detuned thereby indicating the presence of a passenger.

Still other prior art system is U.S. Pat. No. 3,109,893 illustrating the use of a sensing capacitor in one arm of a bridge network thereby effecting the coupling of the output of an oscillator to a trigger circuit for actuation. In this particular environment, the trigger circuit couples a telephone line to a speaker for listening.

U.S. Pat. No. 3,177,967 illustrates the use of a capacitor placed within a seat which is responsive to weight of an individual for effecting the operation of an oscillator.

Still other systems use a capacitor to tune an oscillator in the presence of the article being sensed.

SUMMARY OF INVENTION

It is therefore a principle object of this invention to manifest the presence of an individual on a seat by means of adding body capacitance to the capacitance of a sensor thereby effecting the output of a logic amplifier without affecting the operation of an oscillator.

It is a further object of the invention to have one oscillator generate a pulsing electrical signal for application to a plurality of electronic sensing switches.

It is another object of the invention to provide an electronic seat sensing switching system utilizing complementary MOS devices.

It is still another object of the invention to provide an electronic seat sensing system for the front seat of a motor vehicle having three independent sensing positions each supplied from a single source or oscillator.

It is yet another object of the invention to provide an electronic seat sensing switch system for use in motor vehicles wherein the power drain from the vehicle battery is relatively insignificant so as not to affect the electrical system of the vehicle.

In accordance with these and other objects which will hereinafter become evident there is illustrated, described and claimed herein an electronic seat sensing system having a plurality of seat position electrical circuits for sensing the presence of an individual sitting thereon. Each electrical circuit comprises a first and second buffer electrically connected in series with an amplifier. A sensor means is electrically connected to the junction between the two buffers and is responsive to a physical characteristic of a vehicle occupant manifesting his presence in a seat position. The system has as its signal source for each of the seat position electrical circuits, a single oscillator electrically connected to the first buffer of each circuit. The presence of an occupant, as sensed by the sensor, switches the output of the amplifier without affecting the operation of the oscillator.

DETAILED DESCRIPTION

Figure 1:
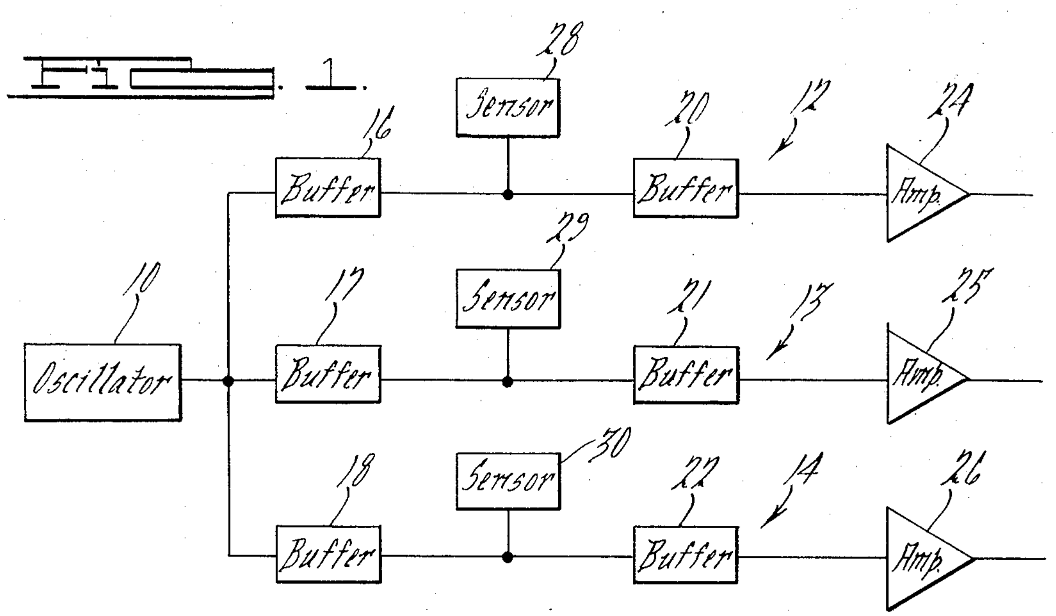
FIG. 1 is a block diagram of the electronic sensing system of the present invention.

Referring to the Figs. by the characters of reference, there is illustrated in FIG. 1 a block diagram of the electronic seat sensing system of the present invention. An oscillator 10 supplies a continuous source of pulsating electrical signals to each of a plurality of seat position electrical circuits 12, 13 and 14. Each electrical circuit is connected in parallel to each other and comprises a first buffer 16–18 electrically connected to the oscillator 10, a second buffer 20–22 electrically connected respectively to each of the first buffers and an amplifier 24–26 electrically connected respectively to each of the second buffers. Electrically connected to the junction between the first and second buffers respectively is a sensor means 28–30 responsive to a physical characteristic of vehicle occupant.

The first buffers 16-18 provide isolation between the sensor means 28–30 and the oscillator 10 thereby preventing the operation of the oscillator 10 from being affected by the sensor means. With this buffer, the oscillator is able to supply a number of seat position electrical circuits depending only on the power output of the oscillator and the input power requirements of the buffers.

The sensor means 28–30 is responsive to a physical characteristic such as body capacitance of an individual for manifesting the presence of the individual in each seat position. With no individual present, the output of the first buffer is essentially the output of the oscillator and is conducted through the second buffer. When an individual is in proximity to the sensor means 28–30, the capacitive loading coupled by the sensor to the input of the second buffer 20–22 effectively blocks the conduction through the second buffer of the signals from the first buffer.

The amplifier 24–26 is responsive to the output from the second buffer, according to the capacitive loading of the sensor means 28–30, for generating an electrical signal. In the normal situation, without any added capacitance due to an individual, the amplifier generates a first signal and with the added capacitance to the second buffer, the amplifier generates a second signal. Each of these signals may be coupled to a logic circuit or system for indicating the presence or absence of an individual in a vehicle. An example of such a system may be found in the Sequencing Belt and Seat Warning System With Vehicle Start Interlock by Poul Andersen and assigned to a common assignee. In that system, the electronic seat sensing system of the present invention may replace the seat switches.

Figure 2:
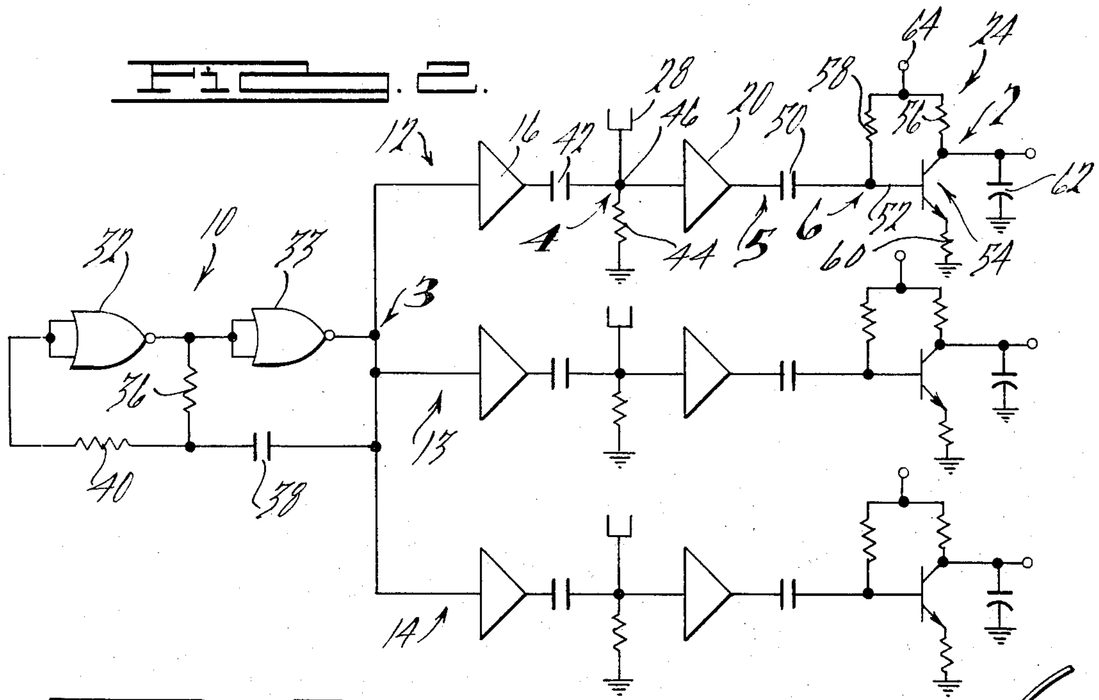
FIG. 2 is a schematic of the circuitry of FIG. 1.

Referring to FIG. 2, there is illustrated in schematic form, the preferred embodiment of electronic seat sensing system of the present disclosure. FIGS. 3–7 are voltage waveforms which may be found at the corresponding identified places in the schematic of FIG. 2. For the purpose of discussion, only the oscillator 10 and one seat position electrical circuit 12 will be explained. Each of the other circuits 13 and 14 are identical in structure and function. In FIG. 2, the large single digit numerics refer to the corresponding waveform Fig.

The oscillator 10 in FIG. 2 is an astable multivibrator having first and second two input NOR gates 32 and 33 electrically connected in series. Each of these NOR gates is fabricated according to Complementary Metallic Oxide Semiconductor techniques, hereinafter referred to as C/MOS. The principle characteristic of these devices particularly suitable for this environment is the very low power drain from a power source such as a vehicle battery. This low power drain allows the devices to be in a constant condition of readiness even after a period of time during non-use of the vehicle without adversely affecting the starting capabilities of the electrical system.

The timing circuit of the oscillator 10 comprises an electrical circuit having a first resistor 36 and a series capacitor 38. This curcuit is electrically connected in feedback between the input of the second NOR gate 33 and the output thereof. In addition the output of the second NOR gate 33 functions as the output of oscillator 10. A second resistor 40 is electrically connected between the junction of the first resistor 36 and capacitor and to the input of the first NOR gate 32. The function of the second resistor 40 is to have the frequency of the oscillator 10 independent of the supply voltage variations. Both inputs of each NOR gate 32 and 33 are electrically connected together for better electrical operation, however, one input of the first NOR gate may be used to control the oscillator if desired. For a more detailed explanation of the oscillator, reference is made to RCA's Digital Integrated Circuits Application Note ICAN-6267.

Figure 3:
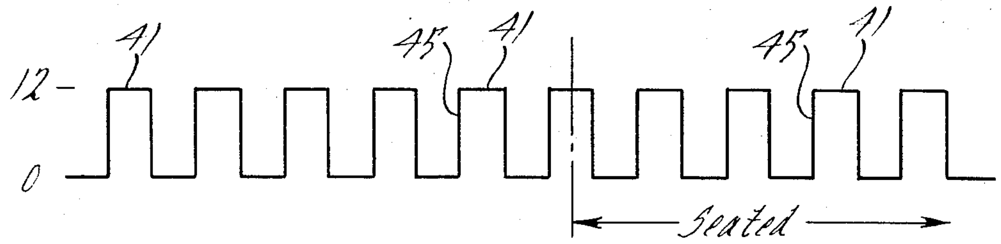
FIGS. 3–7 are voltage waveforms taken at several points indicated on FIG. 2.

In the preferred embodiment, the oscillator operates at a frequency of approximately 125 hertz although the circuit has been tested at frequencies up to 40 kilohertz. The reason for the low frequency operation is to conserve the power drain from the vehicle battery. FIG. 3 illustrates the voltage waveform 41 at the output of oscillator 10.

The first buffer 16 is also a C/MOS device and in particular may be a monolithic silicon device such as RCA's CD4010A. This is a non-inverting buffer fabricated according to C/MOS techniques. This buffer as previously indicated, functions to isolate the oscillator 10 from the electrical effects and operation of the seat position circuit 12 of which the buffer 16 forms a part. The presence of this buffer 16 permits parallel independent operation of several seat position circuits from one oscillator. If the buffer 16 were removed, the action of the sensor 28 would tend to quench or detune the oscillator 10.

Figure 4:
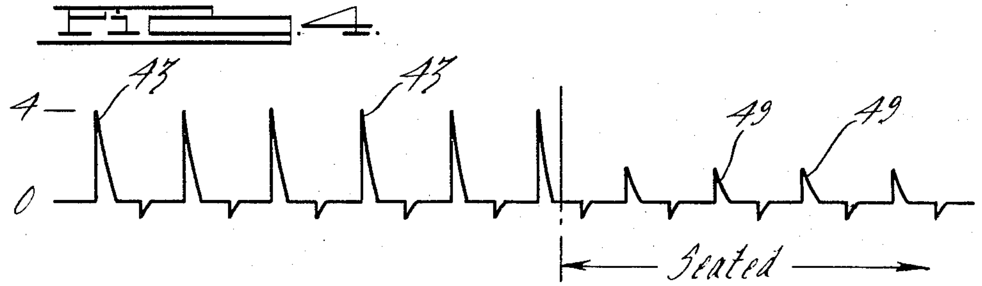

A first capacitor 42 is electrically connected in series with the output of the buffer 16 for coupling the a-c component of the oscillator waveform to the second buffer 20. This is illustrated in FIG. 4 showing a series of pulses 43 which are essentially on the leading edge 45 of each pulse 41. The resistor 44 electrically connected between the input of the second buffer 20 and ground provides a discharge path for the capacitor 42. In addition the size of the capacitor 42 affects the sensitivity of the sensor 28. The smaller the capacitor the more sensitive is the sensor due to the effect of the stray capacitance of the vehicle.

Figure 9:
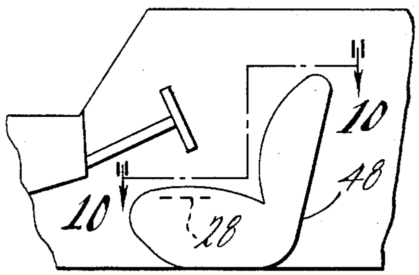
FIG. 9 is a plan view of motor vehicle seat showing the relative position of the sensor.
Figures 8, 10:
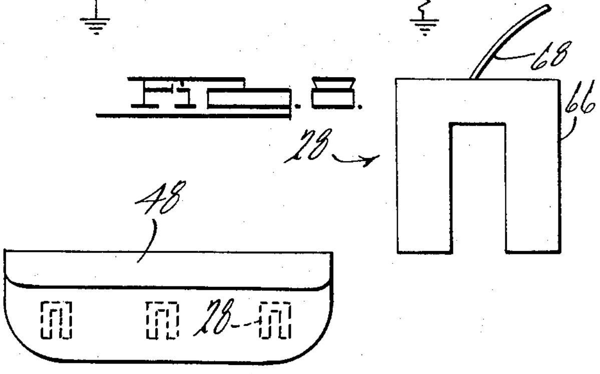
FIG. 8 is a plan view of the preferred embodiment of the sensor of the present invention.
FIG. 10 is a top view taken along line 10—10 of FIG. 9.

The sensor 28, illustrated in detail in FIGS. 8–10 is electrically connected at the junction 46 of the capacitor 42, the resistor 44 and the input of the buffer 20. In a normal condition, the sensor couples a capacitance on the order of magnitude of approximately twenty-five picofarads to the input of the buffer 20. When an individual sits on the seat 48, FIG. 9, the added capacitance of the individual increases the capacitance applied to the buffer 20. As illustrated in FIG. 4, the electrical effect of this added capacitance is to substantially reduce the voltage magnitude of pulses 43 at the junction 46.

Figure 5:
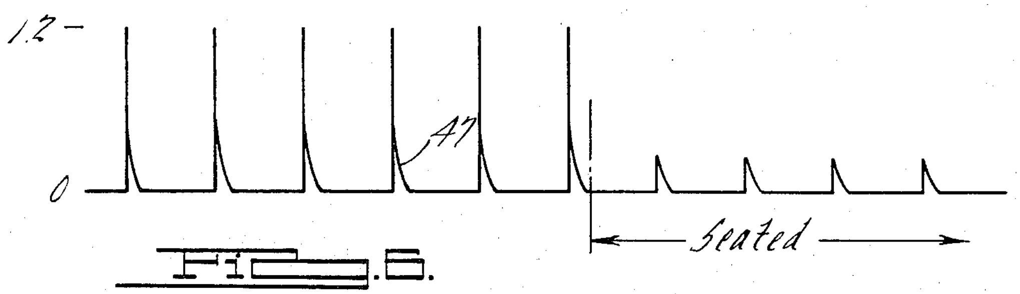

The second buffer 20 is substantially identical to the first buffer 16. The low input capacitance of the buffer allows conduction of the pulses 43 from the first buffer to the output thereof. However, the pulses 43 are diminished in voltage magnitude as illustrated in FIG. 5. In the normal state, non-seated, the magnitude of the pulses 43 is sufficient for conduction generating the output pulses 47 illustrated in FIG. 5. However when the sensor 28 detects an added capacitance, the pulses 49 are not large enough for conduction by the buffer.

A second coupling capacitor 50 is electrically connected in series with the output of the second buffer and functions to couple the a.c. signal 51, namely, the pulses 47 to the base 52 of the amplifier transistor 54. The d.c. level due to non-conduction of the second buffer is blocked from the base 52, driving the transistor 54 into conduction.

Figure 6:
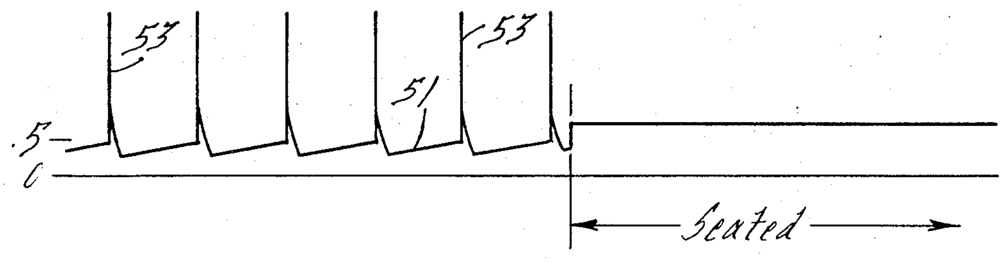
Figure 7:
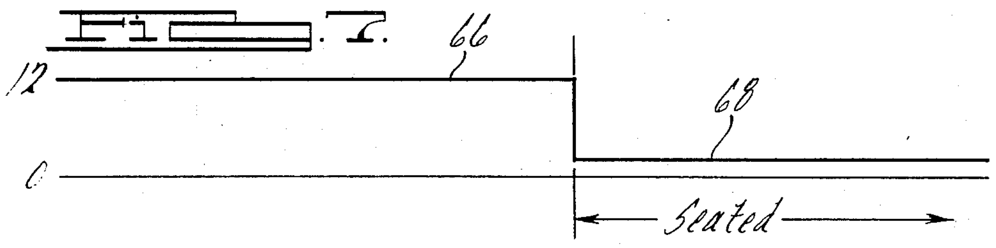

The amplifier 24 illustrated in FIG. 2 is a grounded emitter NPN transistor 54 having a collector resistor 56, a bias resistor 58 and an emitter resistor 60. An output capacitor 62 functions to smooth the output waveform as illustrated in FIG. 7 and does not reflect the voltage spikes 53 on the base 52 as illustrated in FIG. 6.

When the second buffer 20 is conducting, the output is coupled to the base 52 of the transistor 54 by the capacitor 50. This causes the base to be placed electrically below the voltage threshold of conduction of the transistor 54. As each pulse 47 is applied to the capacitor 50, the capacitor is discharged. Between pulses the capacitor 50 attempts to charge through the resistor 58 to the voltage source at terminal 64. However, by selection of the resistor and capacitor values, the time constant of this circuit is extremely long. When no pulses appear on the output of the second buffer, the biasing resistor 58 forward biases the base emitter junction of the transistor 54, driving the transistor into conduction. The output of the amplifier 24 is a first signal 66 when the sensor 28 is normal and is a second signal 68 when the sensor senses an additional capacitance.

FIGS. 8–10 illustrate the positioning of a preferred embodiment of the sensor 28 in the three seat positions of the front seat 48 of a motor vehicle. The sensor is placed below the surface of the cushion of the seat 48.

In the preferred embodiment, the sensor 28–30 is a U-shaped flat mylar member 66 having one broadside copper plated. In the alternative, the plating may be aluminum. A cable 68 is electrically connected to the plated surface of the member 66 at one end and to the circuit junction 46 at the other end. The U-shape provides maximum coverage for the seating area while avoiding the crinkling sound a large flat member would generate.

The sensor 28 as previously indicated has a normal capacitance with respect to the vehicle of approximately 5 picofarads. However, when the physical characterisic of body capacitance of a vehicle occupant sitting in the seat, is sensed by the sensor 28, the capacitive effect at the junction 46 is increased.

There has thus been illustrated and described an electronic capacitive responsive sensing switch system such as may be used in a motor vehicle. The system comprises a signal oscillator for supplying a continuous train of fixed frequency electrical signals to each of a plurality of identical seat position circuits. The output of each seat position circuit is a first voltage signal representing the conduction of the oscillator signals through the circuit unaffected by the capacitive sensing of the sensor electrically connected to the circuit. A second voltage signal is generated from the output of the seat position circuit whenever the capacitive load sensed by the sensor causes the non-conduction of the oscillator signals through the circuit. In either condition, the output of the oscillator is unaffected by the sensor.

What is claimed is:

1. In a vehicle, an electronic seat sensing system for determining the presence or absence of an occupant at each seat position comprising:

a plurality of seat position electrical circuits each comprising in series a first buffer, a second buffer and an amplifier, one of said circuits operatively coupled to each vehicle seat position to be sensed;

sensor means operatively coupled to each of said seat positions and responsive to the body capacitance of a vehicle occupant manifesting their presence in said seat position, said sensor means electrically connected to the junction between said first and second buffers respectively in each of said seat position electrical circuits for controlling the input capacitance of said second buffer; and an oscillator having its output electrically connected to the input of each of said first buffers in each of said seat position electrical circuits, said oscillator providing a continuous source of pulsating electrical signals independently to each of said first buffers of said electrical circuits for generating an electrical signal from said amplifier according to the response of said sensor means, said oscillator unaffected by the body capacitance of any or all occupants.

2. The electronic seat sensing system according to claim 1 wherein said sensor means comprises a flat U-shaped mylar member having one broadside thereof copper plated.

3. The electronic seat sensing system according to claim 1 wherein said sensor means comprises a flat U-shaped mylar member having one broadside thereof aluminum plated.

4. An electronic capacitive responsive sensing switch comprising:

an oscillator for generating a continuous train of fixed frequency electrical signals;

a first buffer electrically connected to the output of said oscillator;

a first capacitor electrically connected in series to the output of said first buffer;

a second buffer electrically connected in series to said capacitor and responsive to the a.c. signals coupled thereto by said first capacitor;

a second capacitor electrically connected in series to said second buffer;

an amplifier electrically connected in series to said second capacitor responsive to the a.c. signals coupled therefrom for generating a first electrical signal and responsive to the absence of the a.c. signals for generating a second electrical signal; and a sensor member comprising a U-shaped member electrically connected to the junction of said first capacitor and said second buffer, said sensor responsive to a capacitive load in the near proximity thereof for electrically loading said second buffer and thereby causing the second electrical signal to be generated from said amplifier.

5. The electronic capacitive responsive sensing switch according to claim 4 wherein said sensor member is a flat U-shaped mylar member having copper plate on one broadside thereof.

* * * * *